M. A. HAWKES.
Soldering Tools.

No. 151,125. Patented May 19, 1874.

WITNESSES
J. W. Garner
W. W. J. Murphy

By

INVENTOR
M. A. Hawkes
per
F. A. Lehmann
ATTORNEY.

AM. PHOTO-LITHOGRAPHIC Co. N.Y. (OSBORNE'S PROCESS.)

UNITED STATES PATENT OFFICE.

MOSES A. HAWKES, OF CHICAGO, ILLINOIS.

IMPROVEMENT IN SOLDERING-TOOLS.

Specification forming part of Letters Patent No. 151,125, dated May 19, 1874; application filed April 6, 1874.

*To all whom it may concern:*

Be it known that I, MOSES A. HAWKES, of Chicago, in the county of Cook and State of Illinois, have invented certain new and useful Improvements in Soldering-Irons; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in soldering-irons; and it consists in the arrangement and combination of devices which will be more fully described hereafter.

Figure 1:
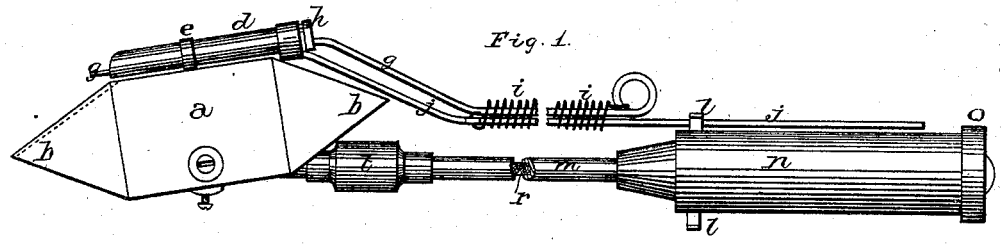
Figure 2:
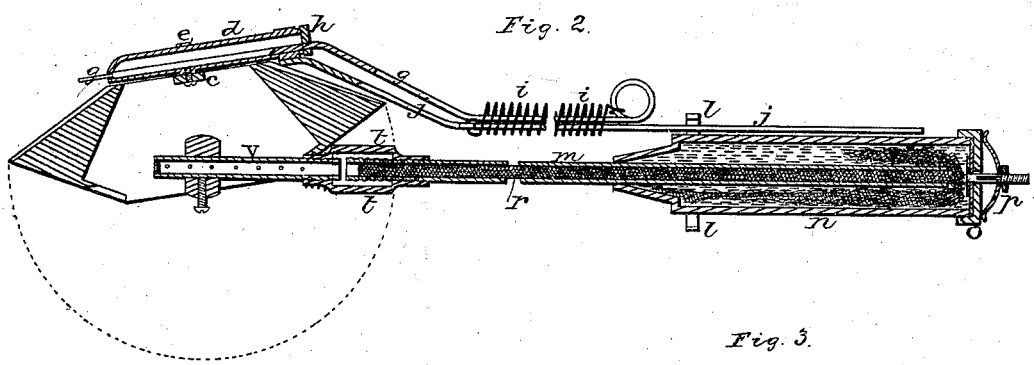
Figure 4:
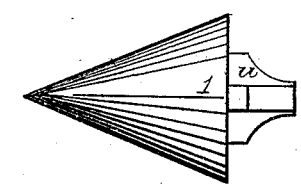
Figure 3:
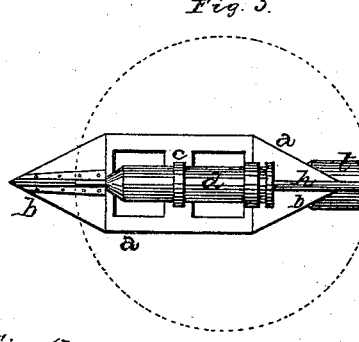
Figure 5:
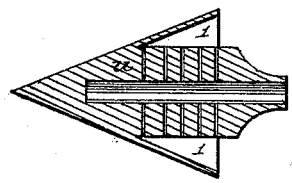

Figure 1 is a side elevation of my invention. Fig. 2 is a longitudinal section of the same. Fig. 3 is a plan view of the head and solder-chamber alone. Figs. 4 and 5 are modified forms of burner.

$a$ represents an ordinary heating head or point, which is formed with two soldering-points, $b$, instead of one, as heretofore made, so that both points can be used, alternately, alike. This head is made hollow, as shown in Fig. 2, being open on its upper and lower sides. Across the opening, in the upper side, is placed a cross-bar, $c$, through which passes a bolt or screw, by means of which the head is pivoted to the solder-chamber $d$, in such a manner that the head can be revolved freely around, and allow either point to be used. The solder-chamber consists of a tube of suitable length and size, secured to the head $a$ by means of the band $e$, or any other equivalent device, and in which the solder is placed, and kept in a melted condition by the heat from the burner below. Through the lower end of this chamber is made a small opening, through which the melted solder drops into a groove formed in the top of each point $b$, so that it will be conveyed directly to the tip. If so desired, a small arched cover may be placed over the top of each groove, so that the solder cannot, by any chance, be spilled over the sides. The opening in the bottom of the chamber, through which the solder pours, is controlled by a fine wire, $g$, which extends through the cap or cover $h$ on the upper end, down through the center of the chamber and the opening in the bottom, and is so formed that it will either close the opening entirely, or can be made to regulate the flow at will. This wire extends upward within easy reach of the operator's hand, and has a spring, $i$, coiled around it, so as to make it automatic in its action, and instantly close, when released, so as to stop the flow of the solder. Instead of this valve passing through the chamber, it may be, if so preferred, bent so as to pass down the outside of the chamber, and close the opening by pressing against it from below. Attached to the solder-chamber is a rigid arm, $j$, which extends upward along the handle, and catches in the small holding-springs $l$, so as to retain the chamber in its proper place.

Whenever it is desired to reverse the points $b$, the arm $j$ is drawn out of the springs, raised vertically until its end points in the opposite direction, which movement reverses the head, when the arm is then drawn horizontally around, so as to catch in the springs $l$ on the opposite side of the handle. The handle of the tool consists of a hollow stem, $m$, and an enlarged reservoir, $n$, attached to its upper end. The reservoir is intended to hold gasoline or any light oil, which is readily converted into gas, and is provided with a screw-cap, $o$, in which is placed a small self-acting valve, $p$, which will admit air into the reservoir as rapidly as it is exhausted by the section of the burner below. The stem or tube $m$ extends up into the reservoir near its top, and is filled with a wick, $r$, the upper ends of which wick drop down into the reservoir below the top of the tube, and thus act as a siphon to draw up the oil, and feed it to the burner. Where the oil is fed to the burner through a wick alone, it is apt to be fed too freely, and be a source of trouble and annoyance; but where it is fed only by a siphon-like arrangement, as above described, it cannot possibly feed it down faster than it is converted into vapor before reaching the burner. The lower end of the tube $m$ is closed, and has a screw-thread cut around it, so that it can be screwed up and down in the chamber $t$; a number of small openings made being through the threaded sides of the tube. By screwing the end of the tube down into the chamber past the openings, the oil from the wick leaks into the chamber, which, being connected to the burner, is always heated, so that the oil is converted into vapor before reaching the burner. By screwing the end of the tube upward the holes are closed, and the flame thus extinguished. The burner $v$ is pivoted inside of the head $a$ by suitable journals, so that it can be freely turned or revolved in the head, or so that the head can be turned upon it. The upper end of the burner is provided with a screw-thread, so that it can be readily attached to the chamber, and should extend upward into the chamber a small distance, so that its end will form a flange or rim, behind which any drops of oil will catch, and so be retained in the chamber until they have been converted into gas. The lower end of this chamber has a screw-thread formed around the rim of its lower edge, so that the reversible double-ended head can be removed, and common single-ended heads inserted in their place.

In Figs. 4 and 5 is shown a head, $u$, around which is formed a hood, 1, which projects over the small gas-jets, and serves to retain the heat more around the head, and so keep it more easily heated.

Having thus described my invention, I claim—

1. The combination of a reversible soldering-head, $a\ b$, and a pivoted soldering-chamber, substantially as set forth.

2. The combination of the arm $j$, the holding-springs $l$, a soldering-chamber, and a reversible soldering-head, substantially as shown.

3. In a soldering-iron, the combination of the wick-tube $m$, extending up into the top of the reservoir $n$, and wick $r$, the wick and tube being arranged, as shown, so as to operate like a siphon, substantially as specified.

4. In a soldering-iron, the combination of the perforated wick-tube $m$ and gas-chamber $t$, serving as a cut-off, substantially as described.

5. The combination of a burner, $v$, and a reversible head, $a$, the head being pivoted on the burner, substantially as shown and described.

In testimony that I claim the foregoing I have hereunto set my hand this 4th day of April, 1874.

M. A. HAWKES.

Witnesses:
 FRANK CLAUDY,
 F. A. LEHMANN.